United States Patent [19]
Fields et al.

[11] Patent Number: 6,128,655
[45] Date of Patent: Oct. 3, 2000

[54] DISTRIBUTION MECHANISM FOR FILTERING, FORMATTING AND REUSE OF WEB BASED CONTENT

[75] Inventors: Duane Kimbell Fields, Austin; Sebastian Hassinger, Blanco; William W. Hurley, II, Round Rock, all of Tex.

[73] Assignee: International Business Machines Corporation, Armonk, N.Y.

[21] Appl. No.: 09/113,678

[22] Filed: Jul. 10, 1998

[51] Int. Cl.[7] .................................................. G06F 13/00
[52] U.S. Cl. .......................... 709/219; 709/225; 707/501
[58] Field of Search .................................... 709/202, 203, 709/205, 217, 219, 223, 225, 227, 310; 707/10, 501

[56] References Cited

U.S. PATENT DOCUMENTS

| | | |
|---|---|---|
| 4,586,158 | 4/1986 | Brandle . |
| 5,196,838 | 3/1993 | Meier et al. . |
| 5,598,188 | 1/1997 | Gove et al. . |
| 5,602,997 | 2/1997 | Carpenter et al. . |
| 5,673,322 | 9/1997 | Pepe et al. . |
| 5,704,017 | 12/1997 | Heckerman et al. . |
| 5,706,502 | 1/1998 | Foley et al. . |
| 5,706,507 | 1/1998 | Schloss . |
| 5,708,780 | 1/1998 | Levergood et al. . |
| 5,855,020 | 12/1998 | Kirsch ........................................ 707/10 |
| 5,918,010 | 6/1999 | Appleman et al. ..................... 709/203 |
| 5,918,013 | 6/1999 | Mighdoll et al. ....................... 709/217 |
| 5,987,606 | 11/1999 | Cirasole et al. ........................ 713/200 |
| 5,991,760 | 11/1999 | Gauvin et al. ............................. 707/10 |
| 6,009,429 | 12/1999 | Greer et al. ................................ 707/10 |

FOREIGN PATENT DOCUMENTS

| | | |
|---|---|---|
| WO9726729 | 12/1996 | European Pat. Off. . |
| WO9727553 | 1/1997 | European Pat. Off. . |

OTHER PUBLICATIONS

Digestor: Device–Independent Access To The World Wide Web (http://www.fxpal.xerox.com/papers/bic97).

IBM Technical Disclosure Bulletin, vol. 40 No. 12 p. 143, Dec. 1997—Look Ahead Filtering of Internet Content.

IBM Technical Disclosure Bulletin, vol. 40 No. 12 p. 181, Dec. 1997—Filtering Internet Content.

IBM Technical Disclosure Bulletin, vol. 40 No. 12 pp.5–8, Dec. 1997—Method for Dynamically Routing Web Requests to Different Web Servers.

IBM Technical Disclosure Bulletin, vol. 40 No. 07 pp. 1–4, Jul. 1997—Service to Enable Common Gateway Interface Programs within Tivoli Management Environment Netfinity Based Internet Applications.

*Primary Examiner*—Viet D. Vu
*Attorney, Agent, or Firm*—Jeffrey S. LaBaw

[57] ABSTRACT

The invention provides an automated system for replicating published web content and associated advertisements in the context of a hosting web site. At the hosting web site, the invention includes the process of brokering a client browser's request for a web page, analyzing the returned content and splitting it into component elements, extracting the desired component elements, recasting the desired elements in the look and feel of the hosting site and sending the recast content to the requesting client as a web page. Once the reformatted file is received at the client, the client browser interprets the HTML in the web page, presenting the content in the context of the hosting web site. On the content provider's web site, the details of the transaction in the web server logs are preserved, proxying a direct page view and ad impression.

37 Claims, 11 Drawing Sheets

DISTRIBUTION MECHANISM FOR FILTERING, FORMATTING AND REUSE OF WEB BASED CONTENT

BACKGROUND OF THE INVENTION

The present invention relates generally to the data processing systems. More particularly, it relates to managing and formatting electronically-published material distributed over a computer network.

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Among the many challenges in running a successful web site is the constant creation and updating the web pages and other files, i.e. web content, to keep the site fresh and new and attractive to web users. Web sites which do not update their content on a regular basis tend to lose their favor. Eventually, fewer "hits" are logged on the web site's pages as fewer users view the information or advertisements which the web site is publishing. As web based advertising fees are typically based on the number of hits a page or site receives, this reduction will directly and adversely affect the revenues of the web site. Of course, the constant update of the web content, while necessary to maintain the popularity of the site, is very expensive in terms of manpower and time.

Furthermore, much of the information on a particular web site is redundant when compared to information available on other similar sites. Some of this duplicate information represents differences in opinion and is no doubt the sign of a tolerant and free society. However, much of the information is simply a duplication of the same news on each web site. From the perspective of the web site content provider, it would be efficient if some of the information found on other sites could be reused or "hosted" on his site. Thus, additional manpower for writing and entering articles on the web server can be reduced or eliminated. Of course, such reuse is subject to the copyright laws and must be the subject of an agreement with the content provider of the source material.

While Web-based content exists in abundance, it is not necessarily easy to persuade a web content provider to share content on a low or no charge basis. This is especially true for Web-based news articles, as these news articles typically represent the major revenue generating content for the publisher by carrying advertising banners above and/or below the article text. Therefore, the web publishers are apt to charge a large amount for licensing the content to other sites for reprinting. Each reprint represents a loss of revenue under the standard arrangement of exporting the content in raw format to the licensing host and that host posting the articles on their own site without the publisher's advertisements.

Further, even if a web site operator could find a content provider willing to share their content at economically favorable terms, other problems exist. A single content provider may not be likely to provide the complete gamut of articles which the hosting web site would like to serve to its web clients. It would be preferable that the hosting site be able to use content from a variety of potential content providing web sites. Again, the likelihood of finding many willing quality web content providers is even lower. Yet even if this feat were accomplished, as each site has its own look and feel, if the content was presented in the format as it originally appeared on each of the web sites, the hosting site would present a disjointed hodgepodge collection of material. It is hardly the professional image that the hosting site should ideally project.

It is unlikely that a web content provider who is essentially sharing his content for free will be willing to install special software or specially format his information for the hosting site. If the material comes in raw format, considerable manpower must thus be devoted to making borrowed material on the hosting site look as though it was specifically created for the site. This effort is naturally compounded where material comes from a range of web content providers. Further, there is likely to be some lag between the time that the web content is available on the content provider's web page and its appearance on the hosting site. This dilutes the desired appearance of the hosting site having the latest and greatest material.

In reality, the hosting site is unlikely to find many partners without some convincing demonstration that its reuse of the material will somehow benefit the original content provider in some way, much less endanger his revenue stream.

The present invention solves this important problem.

SUMMARY OF THE INVENTION

It is an object of the invention to reduce the expense and effort of providing content in a new hosting web site.

It is another object of the invention reuse content from other web sites with little to no licensing fees.

It is another object of the invention to allow a content provider web site to maintain or expand a revenue base through ad impression.

It is another object of the invention to reuse content from a variety of different content providers some of which may use radically different formats and other content.

It is another object of the invention to adapt content from other web sites to the appearance of the hosting web site so that the content from a plurality of web sites appears native to the hosting web site.

It is another object of the invention to automatically update material on the hosting web site as it is changes on the content provider web sites.

It is another object of the invention to reuse web content in a plurality of hosting site web pages each with a respective appearance.

It is another object of the invention to reuse web-based content without requiring a content provider web site to modify content or install special purpose software.

It is another object of this invention to enable a publisher of an electronic document to control the reformatting of the document by a hosting site.

These objects and others are accomplished by managing copyrighted content on the Internet and World Wide Web by means of a filtering and formatting service located on a hosting server. The invention provides an automated system for replicating published web content and associated advertisements in the context of a hosting web site. At the hosting web site, the invention includes the process of brokering a client browser's request for a web page, analyzing the returned content and splitting it into component elements, extracting the desired component elements, recasting the desired elements in the look and feel of the hosting site and sending the recast content to the requesting client as a web page. Once the reformatted file is received at the client, the client browser interprets the HTML in the web page, presenting the content in the context of the hosting web site. On the content provider's web site, the details of the transaction in the web server logs are preserved, proxying a direct page view and ad impression.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE DRAWINGS

Figure 1:
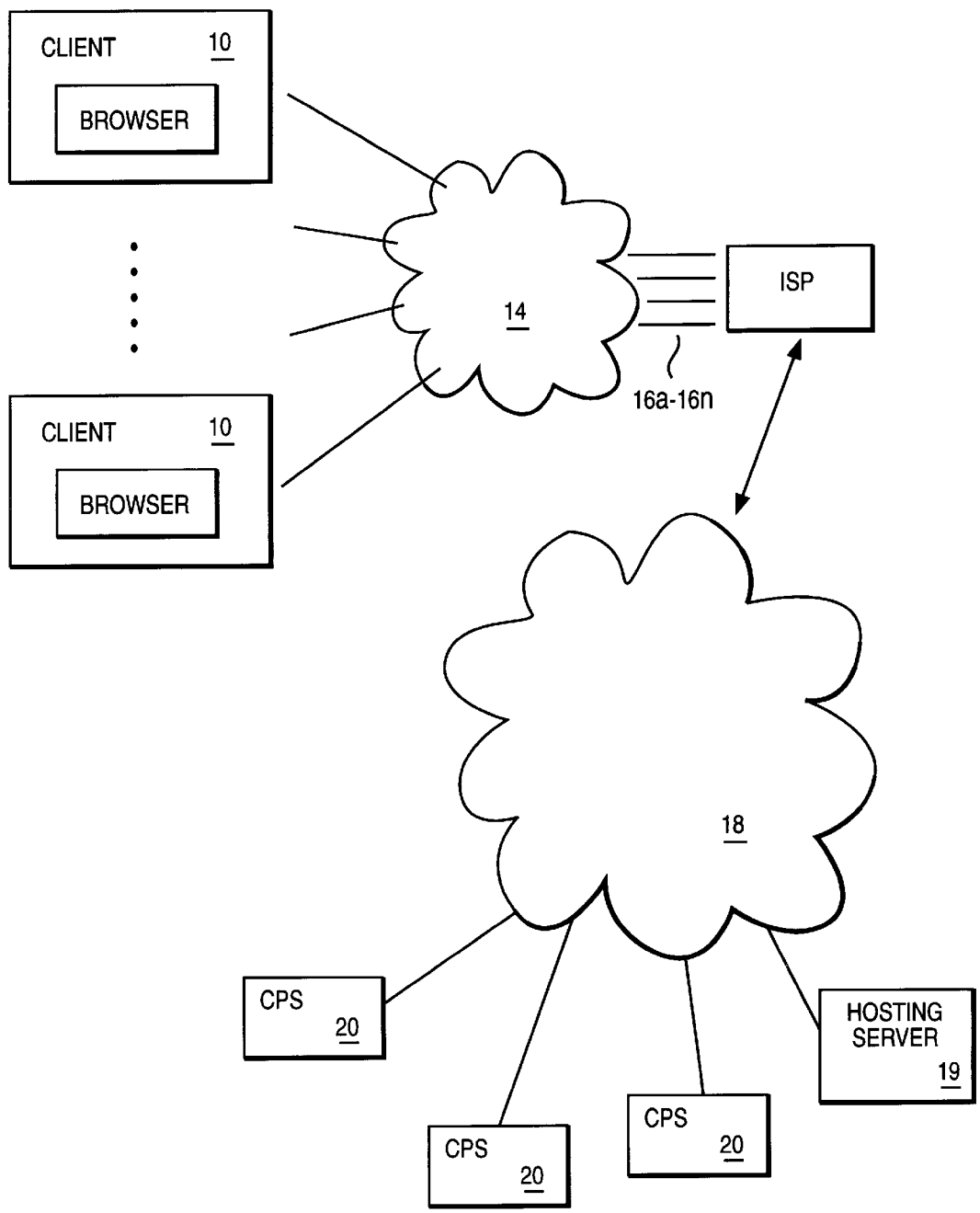
FIG. 1 is a representative system in which the present invention is implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes the hosting server 19 and a plurality of web content provider server machines 20. A client machine typically includes a suite of known Internet tools, including a Web browser 13, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

Figure 2:
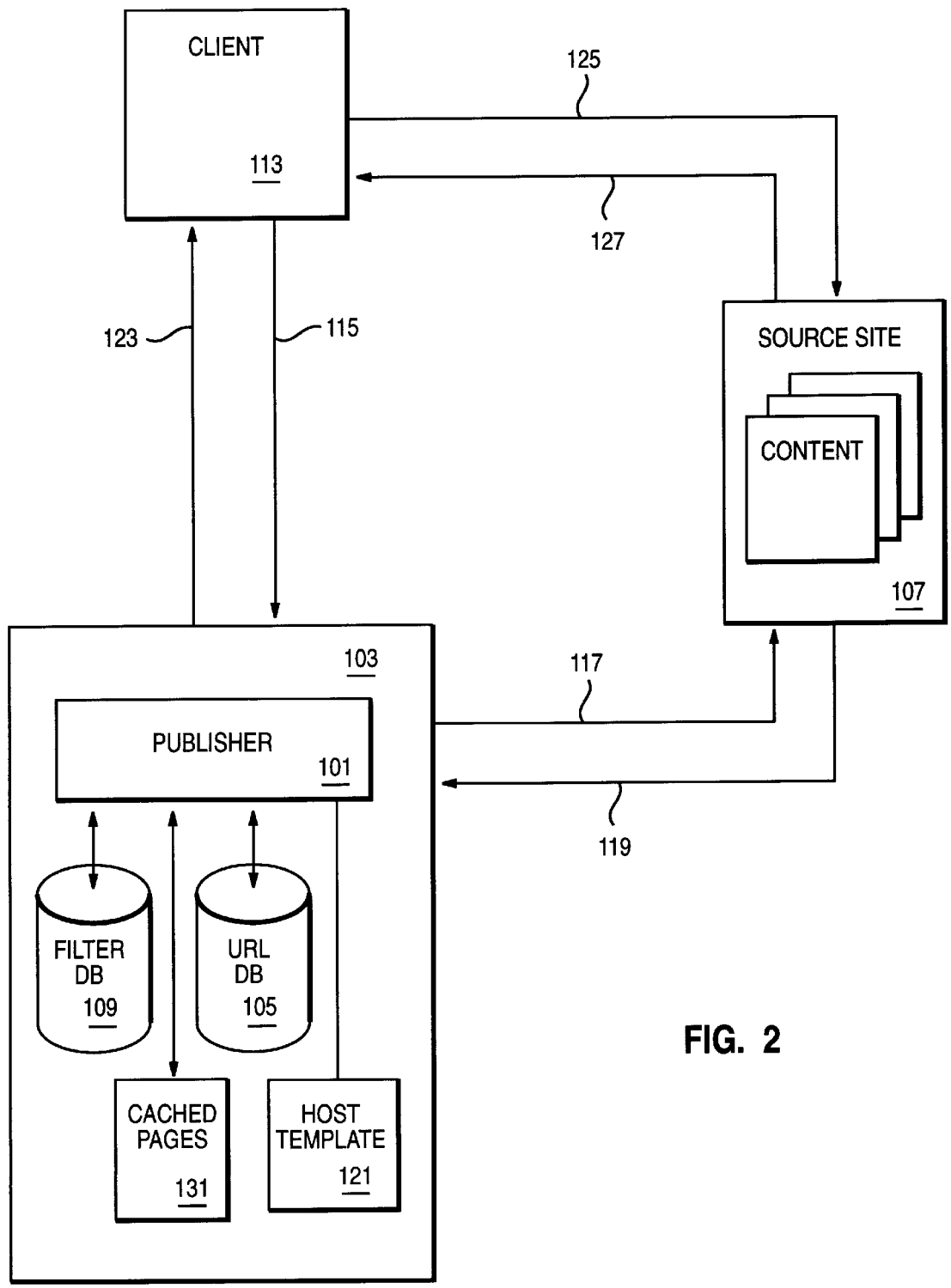
FIG. 2 is a simplified block diagram of a requesting client, hosting server and plurality of content provider servers which illustrates an overview of the process of the present invention.

As shown in FIG. 2, the invention is a method and system for extracting Web-based content, especially, but not limited to, Web-based news articles, from content provider or source Web sites for use by the hosting or "pass-through" Web site. These articles typically are revenue-generating content for the publisher by carrying advertising banners above and/or below the article text. Therefore, the publishers must benefit from the arrangement provided by the hosting site to be interested in licensing their content for a low or no fee. As explained below, the web content provider maintains his ad revenue as the number of "hits" on the advertisements are maintained in a transparent manner. As the articles are also posted at the hosting site, ad revenues can actually increase since the ad impressions are being solicited from two sites rather than one.

During configuration, the pass through publisher 101 at the hosting site 103 is provided with the URLs 105 for the desired content provider web servers 107 and a set of filters 109 for the content publisher's document templates 111. For ease in illustration, a single client 113 and a single web content server 107 are depicted. However, the reader should understand that a plurality of clients and web content servers are typically interconnected through the agency of the hosting site. Upon a request 115 from a client 113 for a given web page, typically made through an HTTP request from the resident browser, the process for providing a page using the pass through mechanism begins. Next, after having established that the requested page originates at the web content server 107, the hosting site makes a request 117 for the page. Presuming that this is a first request for the web page or that a more up to date version of the page is available at the web content provider than is cached locally, the page is returned 119. In today's web technology, the web page is typically an HTML file with references to the component .wav, .mov, gif and JPEG files which together make up the web page as perceived by the user. Secondary page components such as cascading style sheets and Java applets can also be accommodated by the invention. The list above is merely exemplary; any component on a web page can be extracted and recast into the hosting site context by the present invention.

Next, the pass through publisher 101 retrieves the filter definitions and policies from the filter database 109 for this particular content provider web site. Using the filters and the retrieved HTML page, the pass through publisher 101 parses the HTML source for desired components of the page. Typically, this is the title of the article, the ad banner or banners and the article text itself, although other items on the page are potentially desirable. These pieces of content are then recast into a new web page by means of an HTML template 121 that matches the look and feel of the hosting Web site. The new page includes the graphics of the hosting provider as well as the navigational features of the hosting site. This page is then sent 123 to the client 113 for presentation by the browser. In a typical web interaction between browser and server, once the browser receives the HTML page, it issues additional requests for the component files such as .gifs, e.g., ad banners. For the ad banners themselves, the new page preserves the call 125 back to the content provider so that the correct advertising content is presented. It is common that each request of a web page from a server can be refreshed with a different advertisement.

In this way, the end user receives a page with graphic and navigation features from the hosting Web site that has an embedded article from the publisher and an advertisement served from the publisher's site. The final result is content viewed by the end user in host site's native Web context, with an ad banner served from the original publisher, thereby preserving their revenue stream.

It should also be noted that the article text is preferably cached in a local cache 131, on the hosting Web server 103, for faster access and guaranteed access in the event that the publisher's Web site becomes inaccessible. The invention encompasses several variations in the types of information parsed from the page and cached locally. Some of this information may be incorporated in the recast HTML page and some may be used for version checking. For example, information in the HTML header such as "last modified", "content length" and "content type" could be kept with the article text so that the copy in the cache can be compared to the version available at the content provider site. However, in the preferred embodiment, the applicants have found it to be more efficient to simply compare the "last modified" data in the HTML header with the "last modified" data in the hosting system's cache file. Remember that the hosting site 103 makes the request 117 for the client to preserve the accounting data for the content provider web site 107. Since the header data is among the first to be transmitted 119 in response, after a simple compare establishes that the cached version and the version currently available at the content provider web site are the same, the transmission 119 from the content provider can be ended. The hosting system 103 then uses the cached copy of the article. In the event of no response from the content provider web site, a cached copy of the article is used. When there is no cached copy of an article, or the compare establishes that a more recent version of the article is available, the entire transmission 119 from the content provider is received for processing. Alternatively, rather than waiting for a client request, the 'freshness' of the cached content can be ascertained by automatically generating HTTP requests from the cached URLs and monitoring data in the HTTP headers when the page is hit in the background, updating the cache any time the web content provider changes their data.

The aim of caching pass-through web content is to maximize efficiency by minimizing network bandwidth requirements while preserving the transparency of the transaction. By caching copies of the parsed content on the hosting server, serving the content to the end user directly and simulating their 'hit' on the publisher's site in the background, the end user gets content directly from hosting site without having to wait for data to travel from the content web provider's site to the hosting site. However, this method only assures a correct count for the web content provider whose advertising systems use a secondary HTTP request for the image retrieval to generate the ad impression. For systems that rely on dynamic HTML generation to log ad impressions, the ad content must be retrieved for each user and not cached on the host site. The static portion of the page, i.e. the article, however, can be cached, since it remains the same for each visit at least for a relatively long period of time. Serving the recast page to the end user will be delayed by the network for retrieving the ad content, but if the publisher's site becomes unavailable, the end user will not be affected.

An alternative embodiment to the invention is to provide a client based Java applet that retrieves dynamic content from the web content provider's server directly from the end user's browser. This allows the recast page to be loaded from the hosting site's cache to the client browser and invoking the Java applet for the retrieval of marked dynamic content. This reduces the network bottleneck at the hosting site for dynamic HTML ad generation.

Figure 3A:
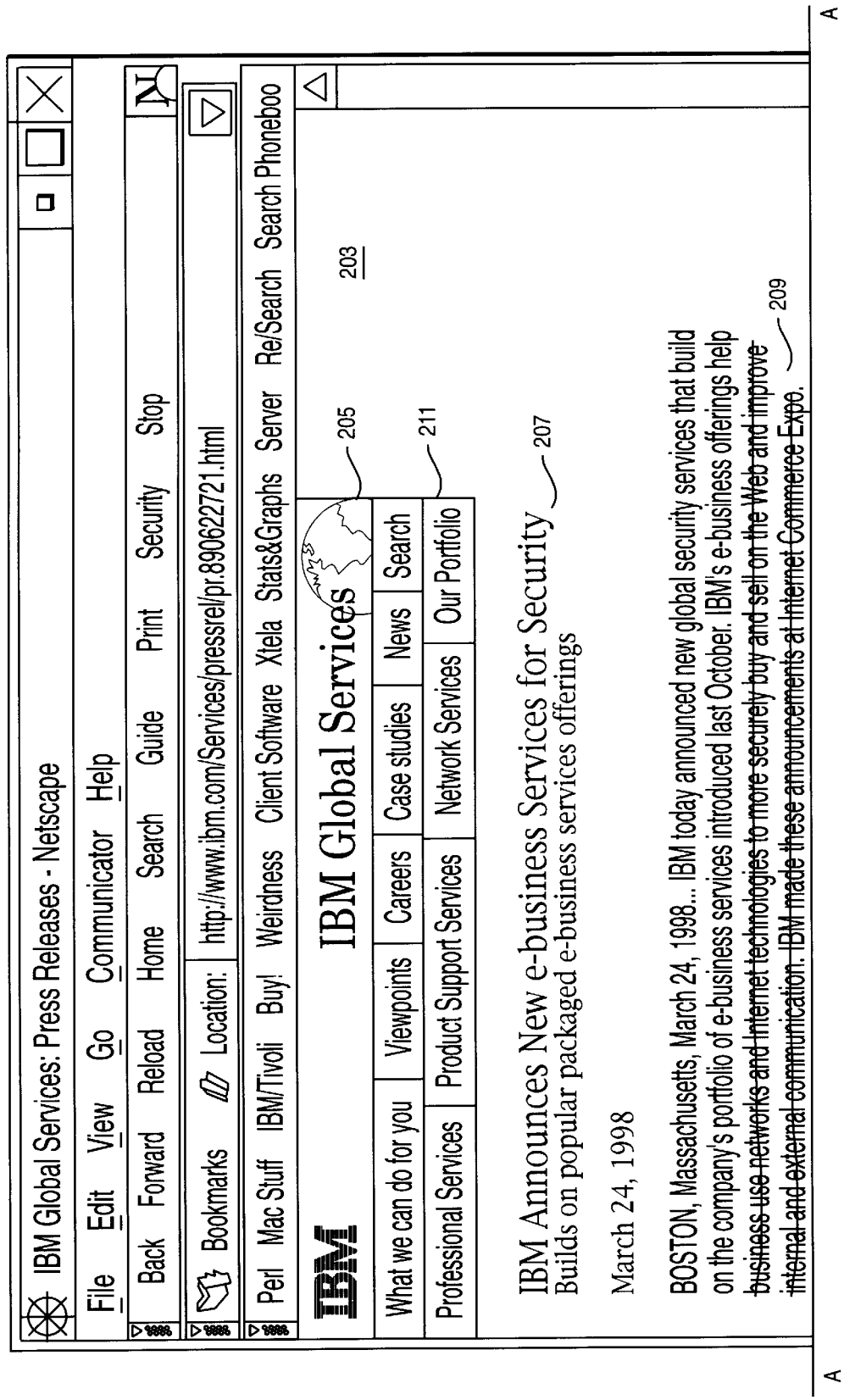
FIG. 3 is an illustrative example of an unchanged source web page as it would normally be presented by a client browser as retrieved from the content provider web server.
Figure 3B:
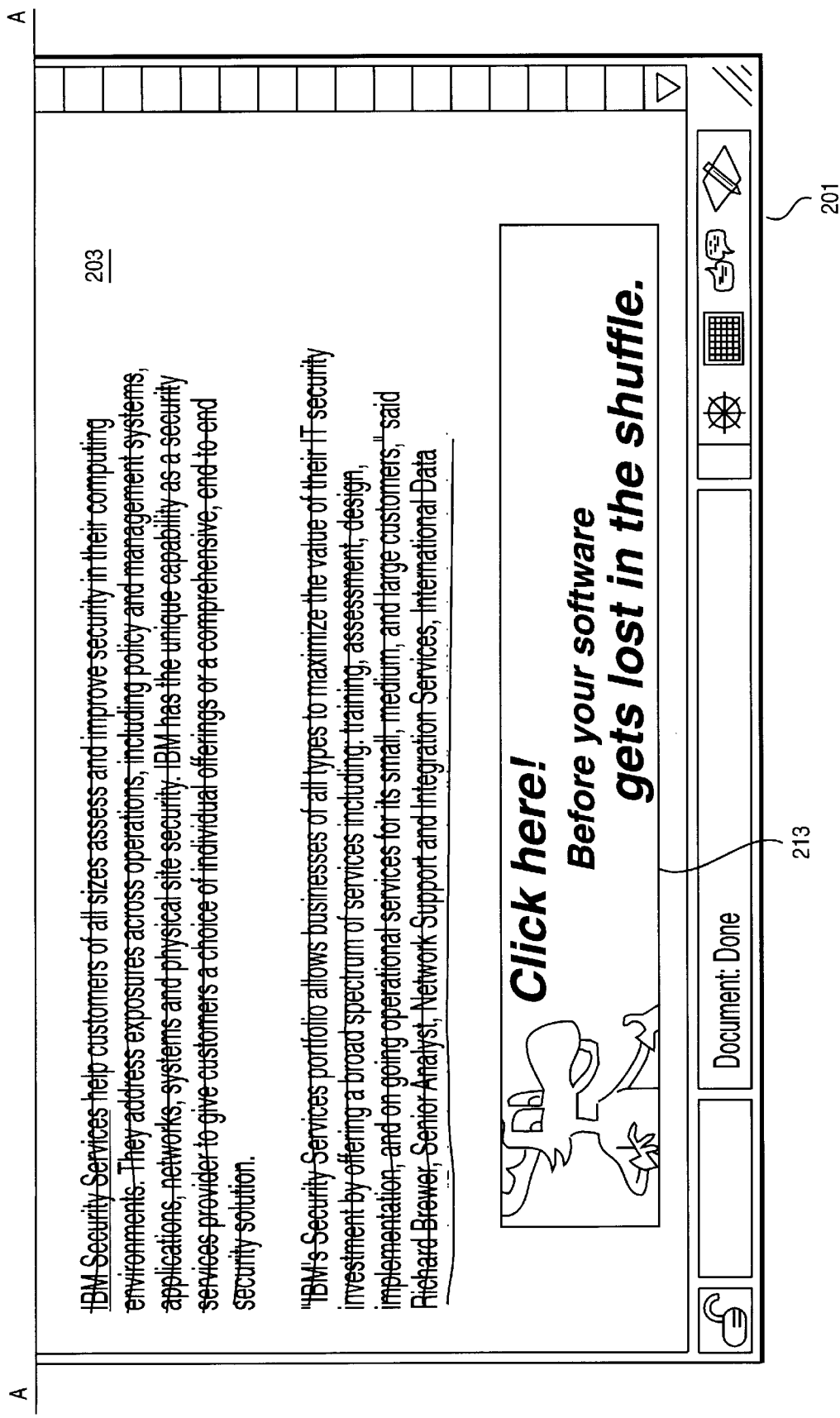
Figure 4A:
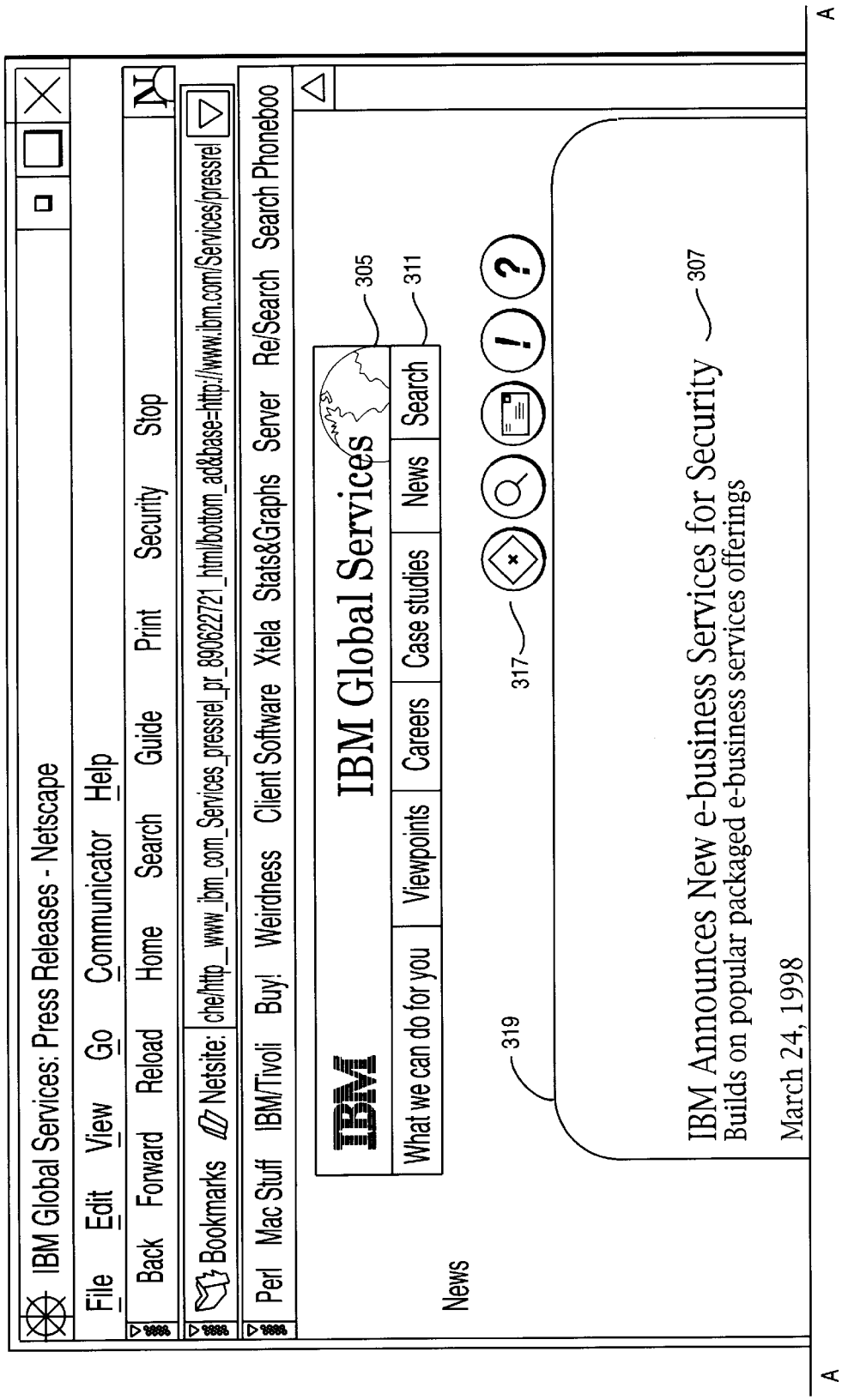
FIG. 4 is an illustrative example of the reformatted web page as presented at the client browser after having undergone the processing of the present invention.
Figure 4B:
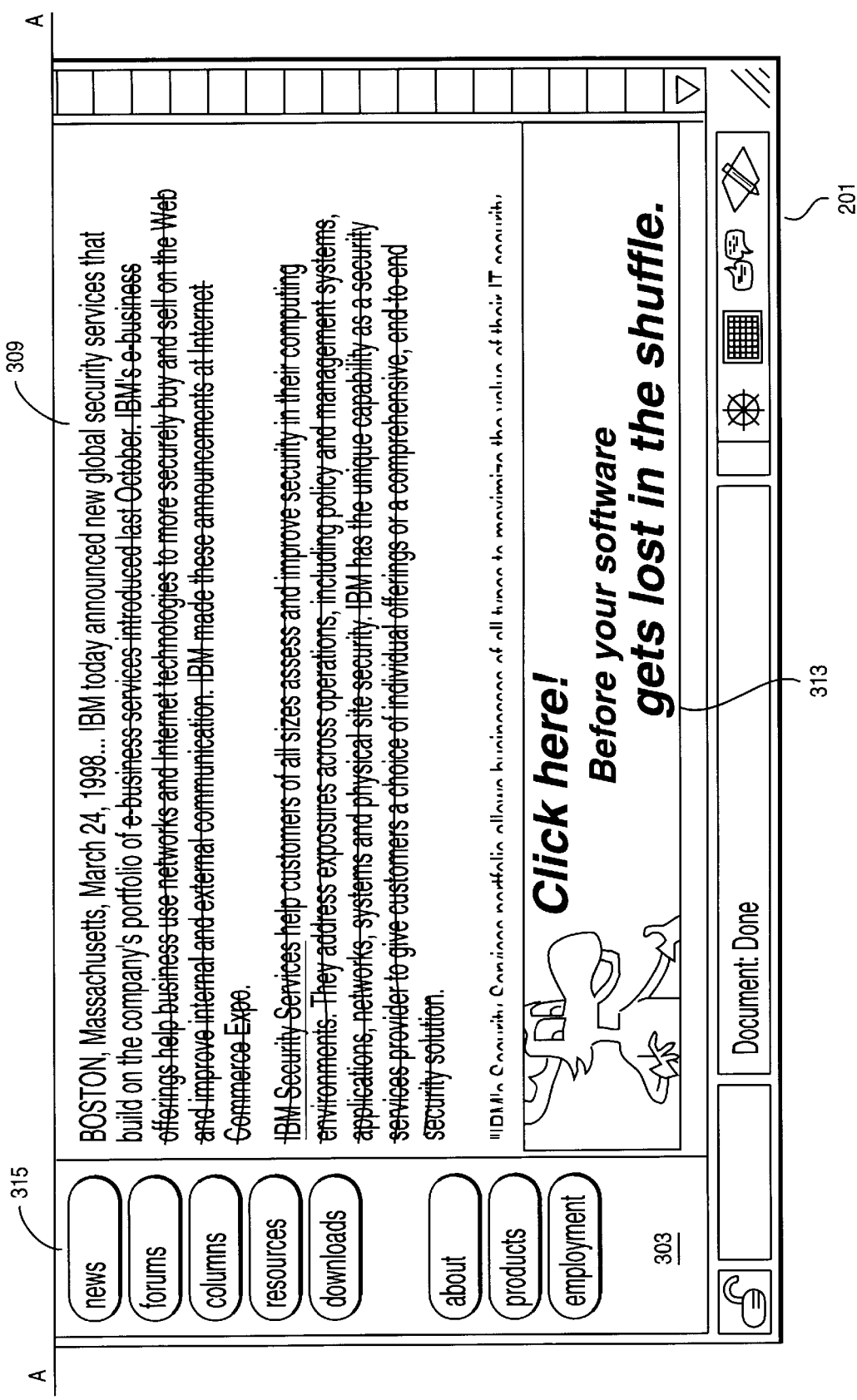

Before describing the hosting process in greater detail, the reader's attention is directed to FIGS. 3 and 4 which respectively show the appearance of a content provider web page as originally sent and the recast web page as sent from the hosting site. It should be understood that the page in FIG. 3 is never actually displayed by the client browser, however, showing the page as it would have been presented if the client had made the request directly to the content provider web site is useful to understand the principles of the invention.

As shown in both figures, the browser window 201 bounds each web page and contains standard graphical user interface elements such as title bars, menu items and scroll bars. The browser shown is Netscape Communicator, showing that a standard client browser can be used unmodified to practice the invention. In the client area 203 showing the unmodified page, the logo banner 205, title area 207 and article text 209 are shown. Under the logo banner 205, a set of links 211 will retrieve other pages from the content provider server. Finally, at the bottom of the page, an ad banner 213 is presented.

In FIG. 4, the recast page is shown in client area 303. In this example, the logo banner 305 is preserved, but moved to a new location (centered). The title area 307 and article text 309 have changed location, font and font size and line length. Other format changes are possible. Some, but not all of the links 311 to other content provider web pages have been preserved according to the policy for the web content provider. Since these links may be important to the web content provider to generate additional hits for other advertising revenue, the provider may wish to institute a policy that at least some of these links will be preserved in the recast page. The ad banner 313 appears at the bottom of the page. Note also that navigational features 315 and 317 native to the hosting server have been added to the page. A background border 319 giving the hosting web site a distinctive look and feel has also been added. Of course, those skilled in the art will recognize that the examples of "desired content" are merely exemplary. The example of the top ad, article and bottom ad is common to many web news articles. The invention allows the hosting site to extract and recast any number or type of desired content elements from the web content provider page.

Depending upon the policy for the web content provider, variations in which elements are preserved in the recast page are possible. For example, the logo 305 is an optional feature. It may be removed or reduced in size or replaced by a different logo stored in the filter definition. The links 311 are optional; they could be removed, reformatted or relocated. As a technical matter, the ad banner 313 is optional, however, from a practical standpoint to obtain content at a low licensing fee, they are probably mandatory. Other items such as copyright notices are not shown in the figure, but could be preserved.

Figure 5A:
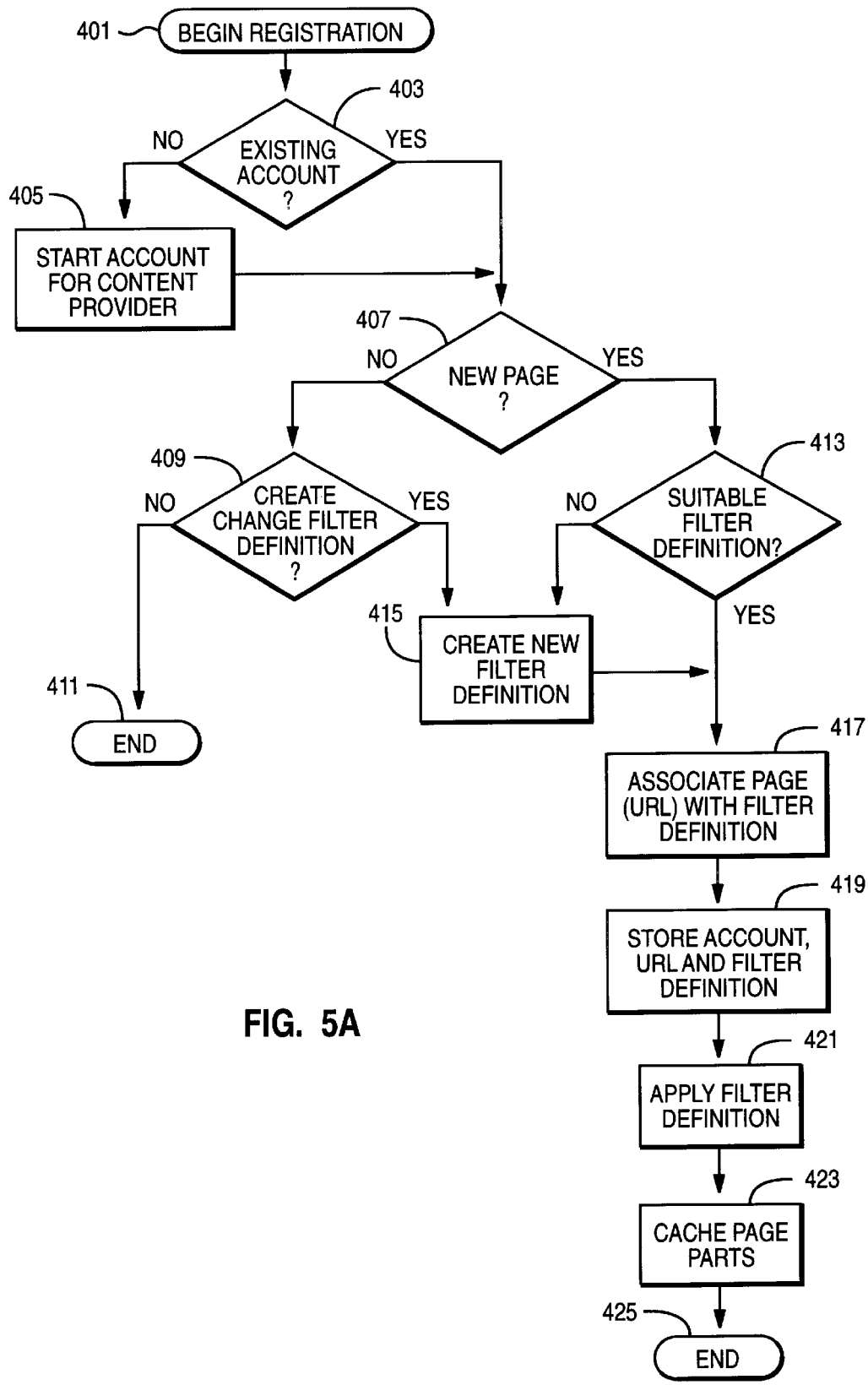
FIGS. 5A and 5B are more detailed flowcharts of a preferred method of the processes which occur at the hosting server.

The process by which a new page is registered into the hosting system is depicted in FIG. 5A. It begins in step 401, when a new page or some other registration action is detected. Step 403 determines whether the page is from an existing account, i.e. an existing web content provider web site. If not, a new account is started step 405. The account or folder is a convenient place to store filter definitions, policies and any transaction information which pertains to a particular content provider.

The test in step 407 determines whether it is a new page, either because of a new URL or new version, which has started the registration process. If it is not a new page, step 409, determines whether it is a request to create or change a filter definition which has started the registration process. For the purposes of this diagram, the policy for a content provider is considered part of the filter definitions although the information can certainly be kept in a separate file. The process will exit in step 411 if there is no filter definition to change.

In step 413, it is determined whether there is a suitable filter definition in the account folder for the content provider for the new page. As most pages in a web site share a common format and style, it is envisioned that a relatively small set of filter definitions can be used for all of the pages from a particular site. If there is no existing filter definition suitable, in step 415, a new filter definition is created for the page. There is more discussion on the creation of filter definitions and policies below in connection with FIG. 6.

In step 417, the page, i.e. URL is associated with the appropriate filter definition and in step 419 the appropriate changes to the account, URL and filter definition files are made. Optionally, the new page can be processed and cached as part of registration. Thus, in step 421, the filter definition is used by the pass through publisher to extract the desired portions of the page. In step 423, these portions of the page are cached for retrieval in the event of a client request. The process ends, step 425.

Figure 5B:
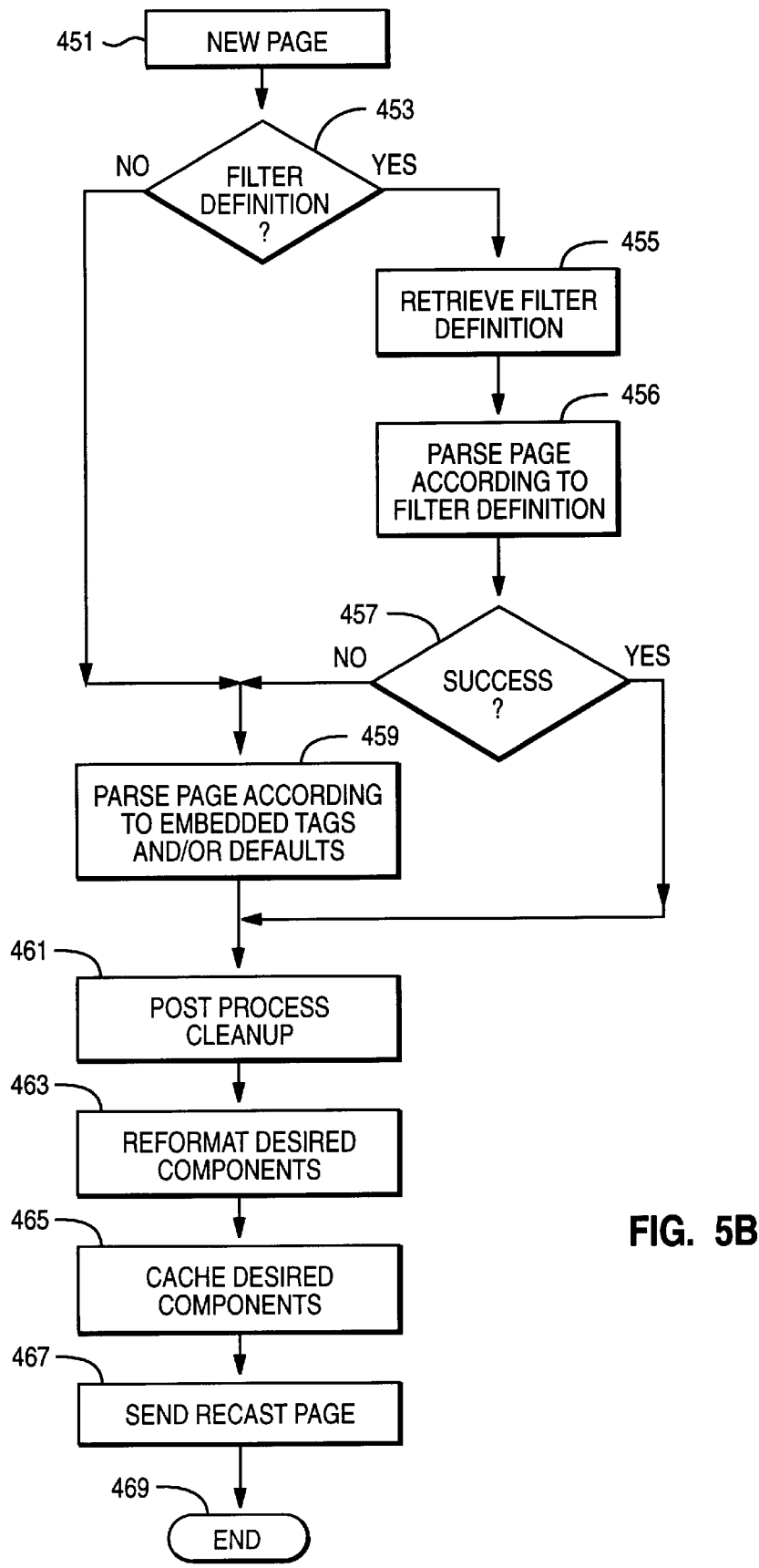

In FIG. 5B, the process for parsing and reusing web content by the pass through publisher is shown. When a client requests a new document from the pass through publisher at the hosting web site, the requesting web client information is recorded, and a request is made by the hosting web site to the content provider's web server on behalf of the requesting web client. The HTTP request to the web content provider server is similar to that which the requesting client could make to the content provider site directly, except with the hosting site as the originator. This assures that the web content server's log files record a visit by the requesting client which is essential for preserving the content provider's revenue stream.

As mentioned above, the hosting site preferably caches content likely to be requested by a client to improve the speed and reliability of the hosting web site pages. In this way, if the document has not changed since the pass through publisher last polled the site, it is retrieved from the local cache after registering the "hit" on the remote server. This reduces Internet bandwidth requirements and improves performance on both the hosting web server and the web content provider server.

However, for the process depicted in FIG. 5B, new content has been retrieved from the web content provider web server, step 451. Once the document content has been retrieved from the host provider, the filter database is searched for the appropriate filter definition, step 453, the filter definition kept for the web content provider. The information in the filter definition will help the pass through publisher parse the document structure of the web page, extracting the desired information. In step 457, a test is performed to determine whether the parsing was a success.

If a filter definition for the page or web content provider is not found, or the first attempt using the associated filter definition was not a success, the pass through publisher can fall back to a series of default filters which will assist in parsing the data, step 459. The hosting site will still be able to present the reformatted content, however, the process will not be as efficient as through an existing filter definition. This "best guess" approach utilizes several methods, including looking for common references to advertising engines, etc. As discussed below, the publisher can also look for a set of embedded tags indicating the desired content. Any document that a filter can not be found for can be logged, allowing staff to later create appropriate filter definitions. In practice, however, hosting sites employing the pass through technique will be able to define templates appropriate to all "rehosted" content. Most content provider sites employ a standard look and feel in their documents, allowing for filters that are appropriate for large numbers of documents found on a particular web site, if not every document on the entire provider web site.

These excerpted components are then run through the pass-through publisher's "post-processing" system to assure that they do not contain "dangerous" formatting code fragments that could adversely effect the hosting web site, step 461. For example, when articles are extracted from within a TABLE structure, HTML TABLE fragments could be left in the filtered HTML that could destroy formatting on the hosting web site. As another example, interactive or browser dependent scripting code could be found in the filtered HTML that may not make sense in the document's new context. The post filtering tasks should also include fixing any relative URLs embedded in the original web page to preserve their original function. Optionally, this can be accomplished by pointing the URLs to the hosting site for handling. For example, many documents are split into several pages by the web publisher. The link to the next part of the article can be translated to a hosting site link so that the next part is automatically served in the hosting site's context. The relative link could also be translated to an absolute link so that it will still lead to the content provider server even when selected in the recast page. As would be readily understood by those skilled in the art, these post filtering tasks could easily be performed by one of the filters, however, the applicants have found it to be convenient to separate the tasks thus simplifying the construction of the filter definitions.

The component HTML file, once extracted, separated, and post filtered is then reformatted into a new document in the style and context of the hosting web site, step 463. This is done by another component of the pass through publisher, a web publishing application that creates a "dynamic publishing template". The web publisher injects the excerpted content, titles, copyright statements and logos as received from the post filtering process. In step 465, the desired components are cached, which may include components useful in determining the version of a web page, but are not used in the recast page. In step 467, the recast page is sent to the requesting client. The process ends, step 469. Once presented by the requesting browser, the content of the hosting web site appears seamless to the user, although it may originate at a plurality of web content provider sites as well as the hosting site itself.

Since the code from the original content has been abstracted and separated from its style and formatting, it is now possible to format before sending it to the user in any of a variety of styles. This can prove useful in a variety of situations. It is common for the web sites of several smaller organizations to be "hosted" by an organization with the technical expertise and capital equipment allowing the smaller organizations to concentrate on creating the content for the web sites rather than the details of maintenance of the server machines. A single pass through publisher could provide a different look and feel for each of the different organizations hosted on its web servers. Alternatively, a single hosting web site could provide several different alternative formats. The choice of which format to present to a particular user could be based on the organization or location associated with the user. Alternatively, the web site could allow the user to choose from among the different formats based on a registration of his preferences in a user profile. Thus, the look and feel of a web site can change dependent upon the requesting audience.

The invention provides a mechanism which allows a hosting web site to provide a wide variety and great amount of third party Web content without incurring high licensing costs. Another benefit of the pass through system is in cost savings. Unlike a traditional system of licensing and republishing content, the hosting system does not require a large production staff since the republishing and re-styling of the content is automatic. A hosting system can provide a much faster production cycle and assure that the content does not quickly go "out of date".

A discussion of filter definition creation follows. The collection of document filters help the pass through engine understand the structure of a wide variety of web documents. The document filters can be created through several methods, including the analysis of the HTML source code, imbedded comments or delimiters and through comparisons with similar documents. Once the style of the web site is understood, a filter can be developed to look for the portion of the original document in which the hosting site is interested in reformatting. Inconsistencies in document style or structure can be neutralized by the use of custom code imbedded in the web page and detailed in the filter definition.

Figure 6A:
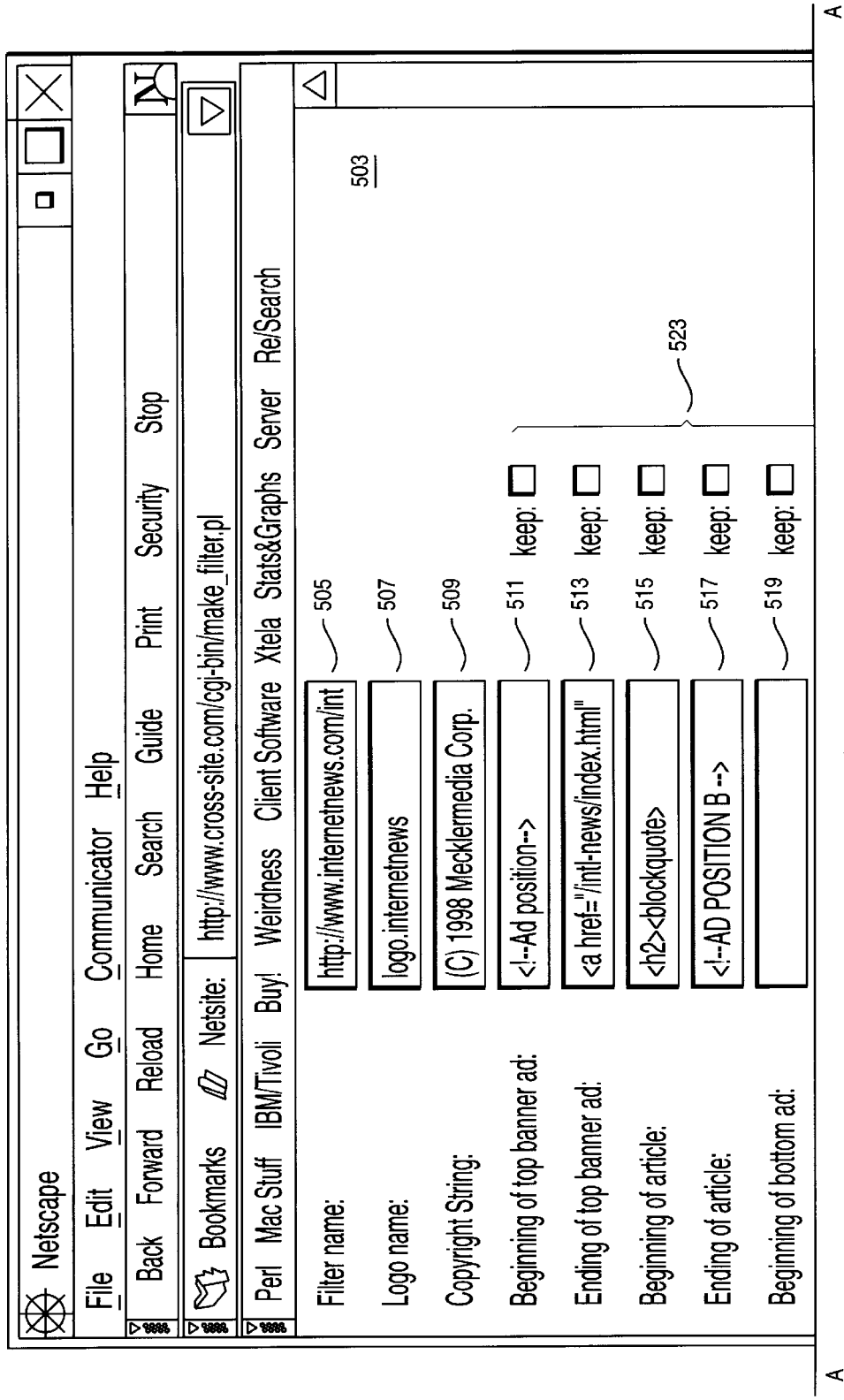
FIG. 6 is pictorial representation of a hosting filter definition interface.
Figure 6B:
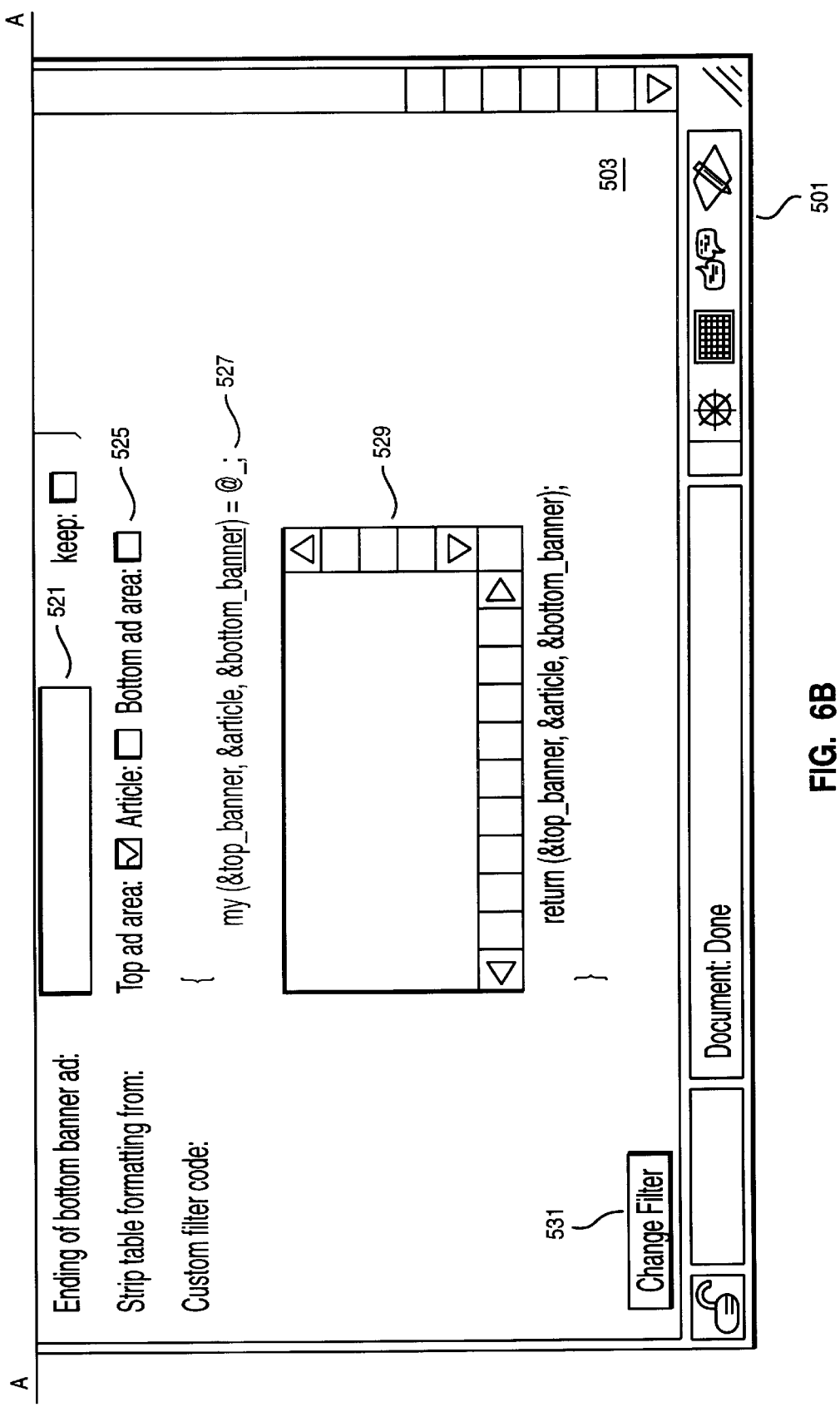

A CGI or other program can be used to create filter definition files. FIG. 6 shows a user interface in which tags or text can be entered manually so that the pass through publisher can more easily parse a web content provider's web pages. In the browser window 501, client area 503 contains a plurality of controls for a set of desired components. Entry fields 505, 507, 509, 511, 513, 515, 517, 519 and 521 are respectively used to enter the filter name, the logo name, a copyright string, a beginning of the top banner ad, the ending of top banner ad, the beginning of the article text, the ending of the article text, the beginning of the bottom ad and the ending of the bottom ad. Note that certain items such as logo name and copyright string could be replacements for those which occur in the web page, rather than indicators of the desired content.

A set of check boxes 523 allows the filter designer to indicate which of these items he wishes to keep on the recast page. The table stripping check boxes 525 indicate whether table formatting should be stripped from certain areas of the content provider's page. Custom filter code can be entered in field 527. Field 529 allows the entry of custom code for filtering code behaviors outside the predefined filters. Special cases can be accommodated by adding a function in Perl, Java, JavaScript or a specialized filter scripting language. Push button 531 allows the user to change to a different filter definition.

Each filter definition is stored in a filter definition database accessible by the pass through publisher. The publisher uses the filter definition to break the content into component parts: The title area, primary and secondary advertisements, and the content itself. The title area includes the title of the web page and is typically marked by HTML tags. The primary and secondary advertisements usually occur at the top and bottom of the web page, but may be located at different locations. They are typically marked in the HTML by tags or comments indicating an advertisement. Depending on various factors, such as the desired look and feel for the hosting web site, the cross-publishing agreement with the content provider, i.e. allowing for republishing certain types of web content but not others and the filter, the content may be very plain. A "bare bones" filter may strip out any extraneous links or "side bars" of information. Alternatively, the content may be a verbatim copy of a selected portion of the original web page.

In addition to providing the system with information on separating the components of the document, filter definitions also include publisher specific information such as the logo or copyright statements and policies that should be used by the pass through publisher when formatting the new version of the document.

Alternatively, the logo and copyright statements could be excerpted components like the title, ads and content.

The filter definitions can also include the "policy" for a particular web content provider. Any number of policies can be established based on publisher, article, article section or any other distinguishing criteria that can be identified. Policies might govern whether content is licensed for use on an intranet, but not on the Internet, or vice versa, or both; how many times a document may be served off a host site; whether the publisher's ads should be passed through or not; what kind of caching strategy should be applied; what cost each view of the article carries for the host site; and so on. The specific types of policies available will depend on the context in which pass-through is being used, whether as a commercial product, integrated into custom solutions, or bundled with other products.

The client machine may be a personal computer such as a desktop of notebook computer, e.g., an IBM or IBM-compatible machine running under the OS/2® operating system, an IBM ThinkPad® machine, or some other Intel x86 or Pentium®-based computer running Windows '95 (or the like) operating system. Of course, the invention may be run on a variety of computers or collection of computers under a number of different operating systems. The computers on which the client software and the hosting and content provider web site reside could be, for example, a personal computer, a mini computer, mainframe computer or a hand held computer. Although the specific choice of computer is limited only by processor speed and disk storage requirements, it is typical that the client computer will be somewhat "lighter weight" than the web server computers. For example, computers in the IBM PC series of computers could be used as clients in the present invention. One operating system which an IBM personal computer may run is IBM's OS/2 Warp 4.0. For the web servers, the computer system might be in the IBM RISC System/6000 (TM) line of computers which run on the AIX (TM) operating system.

Figure 7:
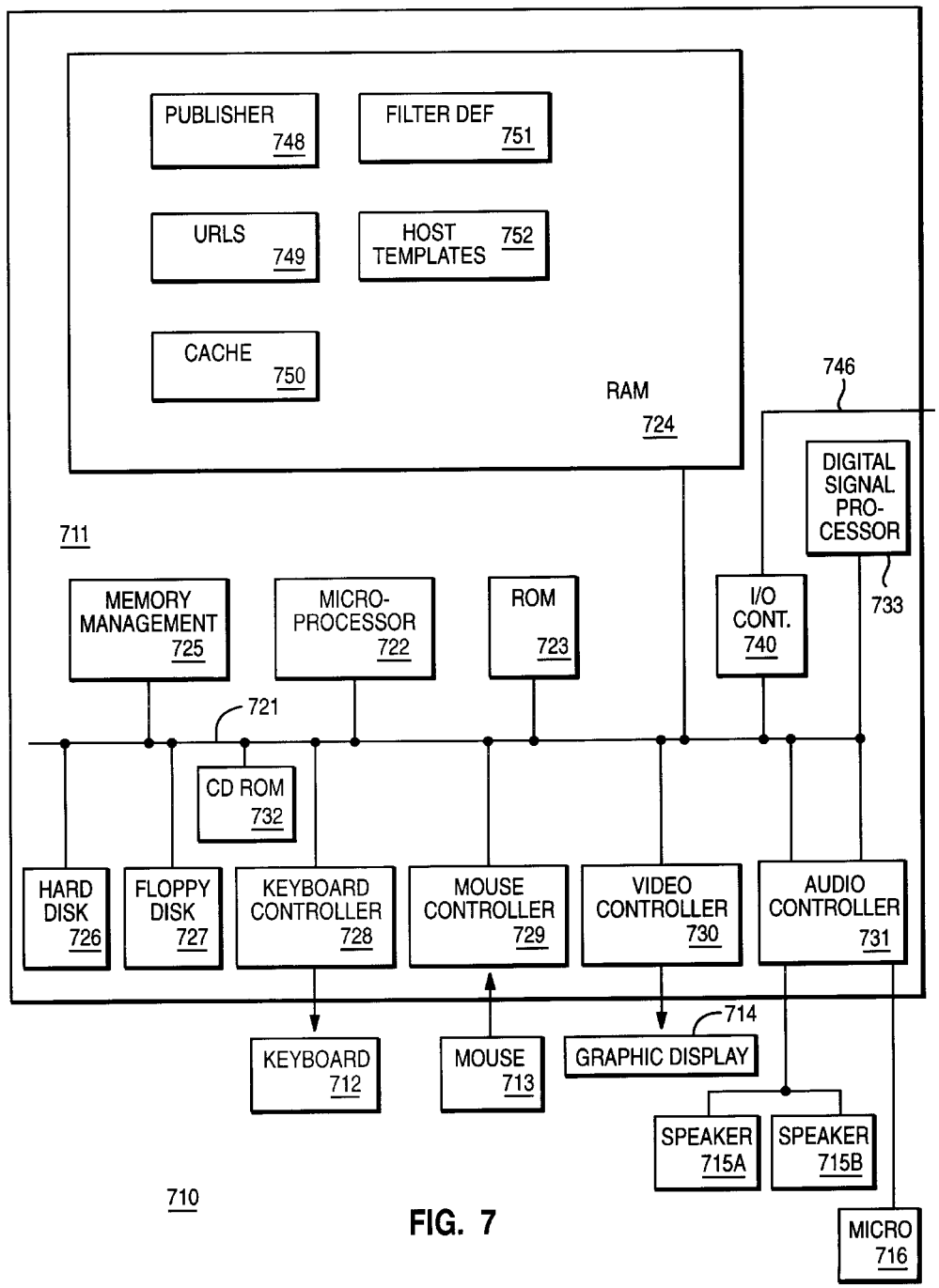
FIG. 7 is a block diagram of the major components of the data processing system unit on which the invention may be practiced.

In FIG. 7, a computer 710, comprising a system unit 711, a keyboard 712, a mouse 713 and a display 714 are depicted in block diagram form. The system unit 711 includes a system bus or plurality of system buses 721 to which various components are coupled and by which communication between the various components is accomplished. The microprocessor 722 is connected to the system bus 721 and is supported by read only memory (ROM) 723 and random access memory (RAM) 724 also connected to system bus 721. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM might be used by the present invention. Other RISC chips made by Hewlett Packard, Sun, Motorola and others may be used in the specific computer.

The ROM 723 contains among other code the Basic Input-Output system (BIOS) which controls basic hardware operations such as the interaction of the processor with the disk drives and the keyboard. The RAM 724 is the main memory into which the operating system and application programs are loaded. The memory management chip 725 is connected to the system bus 721 and controls direct memory access operations including, passing data between the RAM 724 and hard disk drive 726 and floppy disk drive 727. The CD ROM drive 732 also coupled to the system bus 721 is used to store a large program or amount of data, e.g., a multimedia program or presentation.

Also connected to this system bus 721 are various I/O controllers: The keyboard controller 728, the mouse controller 729, the video controller 730, and the audio controller 731. As might be expected, the keyboard controller 728 provides the hardware interface for the keyboard 712, the mouse controller 729 provides the hardware interface for mouse 713, the video controller 730 is the hardware interface for the display 714, and the audio controller 731 is the hardware interface for the speakers 715. An I/O controller 740 such as a Token Ring Adapter enables communication over a network 746 to other similarly configured data processing systems.

One of the preferred implementations of the invention is as sets of instructions 748–752 resident in the random access memory 724 of one or more computer systems configured generally as described above. Until required by the computer system, the set of instructions may be stored in another computer readable memory, for example, in the hard disk drive 726, or in a removable memory such as an optical disk for eventual use in the CD-ROM 732 or in a floppy disk for eventual use in the floppy disk drive 727. Further, the set of instructions can be stored in the memory of another computer and transmitted in a transmission means such as a local area network or a wide area network such as the Internet when desired by the user. One skilled in the art knows that storage or transmission of the computer program product changes the medium electrically, magnetically, or chemically so that the medium carries computer readable information.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language), dynamic HTML and XML (Extended Markup Language).

Moreover, while the preferred embodiment is illustrated in the context of a dialup network and the Internet, this is not a limitation of the present invention. The invention can also be implemented in an intranet environment where a large organization may have several content provider units which provide content for content using units which target different customer segments and have different trade identities. Thus, while the content using units may utilize much of the same information, each will want to recast the information in a different look and feel to project their own trade dress.

There are many possible approaches to creating parsing filters for the invention. For predictable sets of documents the approaches are straight forward. Where the documents vary a great deal some intelligence in either the pass-through mechanism or the user who is configuring the filter is required. In other words, either a user needs to customize the filtering at a level nearing programming or scripting skills to account for all the possible variations after study of a sample set of documents, or the pass-through mechanism needs to be imbued with some level of fuzzy logic or artificial intelligence.

If an agreed on set of tags used by the web content provider and hosting sites, 100% of Web documents are parseable. Thus, no intelligence is required from the pass through mechanism and no programming or scripting is required of the user. Special tags are embedded in the source of the targeted document(s) which identify the content areas. This allows a 'default' filter to be used that requires no customization beyond supplying it with the target URL. These special tags could take the form of HTML comments. In the future, the tags can be formalized as an XML Document Type Definition. It is envisioned that HTML editing programs used by the content provider can add the tags as the web content is created automatically.

The speed of document retrieval is an issue with the invention, since in essence a single user's request for a document is transformed into two separate requests, with all the potential for bottlenecks that any Web transaction has. Caching can provide a partial solution, the title area, article body and other desired content can be cached locally on the hosting site, so that it can be delivered to the user more quickly. Ad source needs to be retrieved from the source site on a per-user basis to preserve the ad accounting process of many web sites. In addition, many ad systems serve ads based on the visitor's browser or other information.

The invention can be configured a stand alone server software product. This would resemble a proxy server and would serve two purposes: it would help the speed issue by devoting more resources to the hosting activity, and it would allow the servicing of several hosting web sites from a single server.

The invention solves several business and technical problems. It provides an attractive mechanism to obtain permission to reprint Web-based content with little or no licensing fees. Since the original publisher's transaction records are preserved, their existing revenue base is maintained through the number of ad impressions counted. Since the ad impressions are now also occurring on the hosting web site with very little work on the part of the original publisher, the revenue is very likely to be increased. Thus, increased traffic is generated for both the hosting web site as well as the content provider's site with very little manual intervention after configuration.

The invention is very flexible and is easily configured to accommodate a wide variety of web content. Through the use of document templates and standard filters, the invention allows simple modification of these elements to tailor them to any number of different content providers' formats and document templates. Once the hosting web server has been configured for a set of content providers, the production staff necessary to republish articles is minimal. Content can be extracted without the content provider web site modifying content to a special format or installing special purpose software. Articles in the hosting web site are automatically synchronized with those in the content provider as changes are made at the content provider web site (so long as noncached material is used). By abstracting the content from any particular content provider site and reformatting the content to the hosting site's format a consistent look and feel is maintained.

In one preferred embodiment of the invention, the hosting web server caches content locally to speed delivery to the requesting client and minimize dependency on the content provider web site. In other embodiments of the invention, unauthorized requests are blocked, eliminating a potential avenue for abuse of the system and copyright violation.

In the attached appendix, examples are given of a content provider's original web page, the template in which in hosting site inserts the excerpted desired content and the resulting recast page with comments. These examples will help the reader more fully understand the principles of the present invention.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

APPENDIX

Original Content Provider HTML:
IBM Global Services
<http://www.ibm.com/services/articles/whatwedo.html>What we can do for
you<http://www.ibm.com/services/business/>Viewpoints<http://www.ibm.com/ser
vices/career/>Careers<http://www.ibm.com/services/business/feature.html>Case
Studies<http://www.ibm.com/services/pressrel/>News<http://www.ibm.com/servi
ces/navtools/otherservices.html><http://www.ibm.com/Search>Search
<http://www.ibm.com/services/profservices/index.html>Professional
Services<http://www.as.ibm.com/>Product Support
Services<http://www.ibm.com/globalnetwork/>Network
Services<http://www.ibm.com/services/ourportfolio.html>Our Portfolio
IBM Announces New e-business Services for Security
Builds on popular packaged e-business services offerings
March 24, 1998
BOSTON, Massachusetts, March 24, 1998 ... IBM today announced new global
security services that build on the company's portfolio of e-business services
introduced last October. IBM's e-business offerings help business use networks
and Internet technologies to more securely buy and sell on the Web and improve
internal and external communication. IBM made these announcements at Internet
Commerce Expo.
<../ebus/security.html>IBM Security Services help customers of all sizes
assess
and improve security in their computing environments. They address exposures
across operations, including policy and management systems, applications,
networks, systems and physical site security. IBM has the unique capability as
a security services provider to give customers a choice of individual
offerings or a comprehensive, end-to-end security solution.
..........
*IBM is a registered trademark of International Business Machines Corporation
<http://www.ibm.com/> IBM Homepage <http://www.ibm.com/Orders/> Order
<http://www.ibm.com/Assist/> Contact IBM
<http://www.ibm.com/IBM/Employment>
Employment <http://www.ibm.com/Privacy/>Privacy <http://www.ibm.com/Legal/>
Legal
The Hosting Site Web Page Template
Home
<http://dev2.cross-site.com/apps/top.map> Need Help? Click on the '?'
<http://dev2.cross-site.com/apps/side.map> Need Help? Click on the '?'
<http://dev2.cross-site.com/cs/?section=News&text=news/news.html>News |
<http://f2.dejanews.com/crosssite/>Forums |
<http://dev2.cross-site.com/cs/?section=Columns&text=columns/columns.html>C
olumns |
<http://dev2.cross-site.com/cs/?section=Resources&text=resources/resources.
html>Resources |

-continued

APPENDIX

```
<http://dev2.cross-site.com/cs/?section=Downloads&text=downloads/downloads.
html>Downloads |
<http://dev2.cross-site.com/cs/?section=Cross-Site&text=about/about.html>Abo
ut |
<http://dev2.cross-site.com/cs/?section=Products&text=products/products.htm
l&sidebar=products/sidebar.html>Products |
<http://dev2.cross-site.com/cs/?section=Employment&text=employment/employmen
t.html>Employment
<http://dev2.cross-site.com/cs/?sidebar=home/sidebar.html>Home |
<http://dev2.cross-site.com/cs/?section=Search&text=sitesearch/search.html&t
itle=Search&logo=logo.crosssite>Search |
<http://dev2.cross-site.com/cs/?section=Mail&text=mail/mail.html>Email |
<http://dev2.cross-site.com/cs/?section=Contact&text=about/contact.html>Cont
act
| <http://dev2.cross-site.com/cs/?section=Help&text=support/help.html>Help
(C)1998 Tivoli Systems
The Recast Web Page (including comments):
(The parsing engine extracted this code from the URL):
<IMG SRC="http://www.ibm.com/services/images/animh.gif" alt="IBM Global
Services" WIDTH=584 HEIGHT=54 BORDER=0><br>
<TABLE WIDTH=584 CELLSPACING=0 CELLPADDING=0 BORDER=0>
<TR><TD><NOBR><A
HREF="http://www.ibm.com/services/articles/whatwedo.html"
TARGET=_top><IMG SRC="http://www.ibm.com/services/images/foryou3.gif"
ALT="What we can do for you" WIDTH=145 HEIGHT=18 BORDER=0></A><A
HREF="http://www.ibm.com/services/business/" TARGET=_top><IMG
SRC="http://www.ibm.com/services/images/viewpt3.gif" ALT="Viewpoints"
WIDTH=81 HEIGHT=18 BORDER=0></A><A
HREF="http://www.ibm.com/services/career/" TARGET=_TOP><IMG
SRC="http://www.ibm.com/services/images/careers3.gif" ALT="Careers"
WIDTH=67 HEIGHT=18 BORDER=0></A><A
HREF="http://www.ibm.com/services/business/feature.html" TARGET=_top><IMG
SRC="http://www.ibm.com/services/images/casestdy3.gif" ALT="Case Studies"
WIDTH=90 HEIGHT=18 BORDER=0></A><A
HREF="http://www.ibm.com/services/pressrel/" TARGET=_top><IMG
SRC="http://www.ibm.com/services/images/news3.gif" ALT="News" WIDTH=52
HEIGHT=18 BORDER=0></A><A
HREF="http://www.ibm.com/services/navtools/otherservices.html"><IMG
SRC="http://www.ibm.com/services/images/countrysites.gif" WIDTH=87
HEIGHT=18 BORDER=0></A><A HREF="http://www.ibm.com/Search"
TARGET=_top><IMG
SRC="http://www.ibm.com/services/images/search3.gif" ALT="Search"
BORDER=0></A></NOBR></TD></TR>
</TABLE>
(It then inserted the code into the hosting site's template, thusly:)
<CENTER>
<TABLE BORDER=0>
<TR>
<TD>
<IMG SRC="http://www.ibm.com/services/images/animh.gif" alt="IBM Global
Services" WIDTH=584 HEIGHT=54 BORDER=0><br>
<TABLE WIDTH=584 CELLSPACING=0 CELLPADDING=0 BORDER=0>
<TR><TD><NOBR><A
HREF="http://www.ibm.com/services/articles/whatwedo.html"
TARGET=_top><IMG SRC="http://www.ibm.com/services/images/foryou3.gif"
ALT="What we can do for you" WIDTH=145 HEIGHT=18 BORDER=0></A><A
HREF="http://www.ibm.com/services/business/" TARGET=_top><IMG
SRC="http://www.ibm.com/services/images/viewpt3.gif" ALT="Viewpoints"
WIDTH=81 HEIGHT=18 BORDER=0></A><A
HREF="http://www.ibm.com/services/career/" TARGET=_top><IMG
SRC="http://www.ibm.com/services/images/careers3.gif" ALT="Careers"
WIDTH=67 HEIGHT=18 BORDER=0></A><A
HREF="http://www.ibm.com/services/business/feature.html" TARGET=_top><IMG
SRC="http://www.ibm.com/services/images/casestdy3.gif" ALT="Case Studies"
WIDTH=90 HEIGHT=18 BORDER=0></A><A
HREF="http://www.ibm.com/services/pressrel/" TARGET=_top><IMG
SRC="http://www.ibm.com/services/images/news3.gif" ALT="News" WIDTH=52
HEIGHT=18 BORDER=0></A><A
HREF="http://www.ibm.com/services/navtools/otherservices.html"><IMG
SRC="http://www.ibm.com/services/images/countrysites.gif" WIDTH=87
HEIGHT=18 BORDER=0></A><A HREF="http://www.ibm.com/Search"
TARGET=_top><IMG
SRC="http://www.ibm.com/services/images/search3.gif" ALT="Search"
BORDER=0></A></NOBR></TD></TR>
</TABLE>
</TD>
</TR>
```

-continued

APPENDIX

```
</TABLE>
</CENTER>
<A NAME="#TOP"></A>
<FONT SIZE="+1" COLOR="#000099" FACE="Arial, Helvetica">
<B>News<B>
</FONT>
<!-- START TOP NAV BUTTONS -->
<TABLE CELLPADDING=0 CELLSPACING=0 BORDER=0 WIDTH=100%>
<TR ALIGN=RIGHT VALIGN=TOP>
<TD BGCOLOR=FFCC33 ALIGN=RIGHT VALIGN=CENTER BORDER=0
WIDTH=100% COLSPAN=2>
<A HREF="http://dev2.cross-site.com/apps/top.map">
<IMG NAME="topbuttons" HEIGHT=35 WIDTH=175
SRC="http://dev2.cross-site.com/images/topbuttons.gif"
BORDER=0 ALT="Need Help? Click on the '?'" ISMAP ></A>
</TD>
</TR>
<!-- END TOP NAV BUTTONS -->
(Similarly, the template has this insertion spot for the article from the
content provider's document:)
<TABLE BORDER=0>
<TR>
<TD>
</TD>
</TR>
</TABLE>
(Into which the extracted article is inserted:)
<H3>
IBM Announces New e-business Services for Security
<BR><SMALL>Builds on popular packaged e-business services
offerings</SMALL>
</H3>
<P><B>March 24, 1998</B></P>
<P>BOSTON, Massachusetts, March 24, 1998 ... IBM today announced new global
security services that build on the company's portfolio of e-business
services introduced last October. IBM's e-business offerings help business
use networks and Internet technologies to more securely buy and sell on the
Web and improve internal and external communication. IBM made these
announcements at Internet Commerce Expo.
<p>    <a href=../ebus/security.html>IBM Security Services</a> help
customers of all sizes assess and improve security in their computing
environments. They address exposures across operations, including policy
and management systems, applications, networks, systems and physical site
security. IBM has the unique capability as a security services provider to
give customers a choice of individual offerings or a comprehensive,
end-to-end security solution.
...
<BR>
</FONT>
</TD>
</TR>
</TABLE>
(The end result is a unified HTML document with elements from the
publisher's page inserted into the host site's template to create a
seamless whole.)
```

We claim:

1. A method for recasting web content on a hosting site, comprising the steps of:

responsive to a request from a client browser for a recast web page from a hosting web server, generating a request by the hosting web server for an original web page from a content provider web server;

parsing the original web page for a first set of desired content elements;

inserting the first set of desired content elements into a web page template containing a hosting web server format, thus creating the recast web page; and serving the recast web page to the client browser;

wherein the appearance of the recast page when presented by the client browser is as though all elements originated at the hosting web server.

2. The method as recited in claim 1, wherein one of the desired content elements is an advertisement element from the content provider web server, and the method further comprises the step of inserting a call back to the content provider web server for the advertising element.

3. The method as recited in claim 1 further comprising the steps of:

caching the desired content from the original page at the hosting web server;

responsive to a second request for the recast page from a client browser, determining whether there is a more recent version of the original page at the content provider server; and using the cached desired content if there is no more recent version of the original page to respond to the second request.

4. The method as recited in claim 3 further comprising the steps of:
  parsing the most recent version of the original web page for the first set of desired content elements;
  inserting the first set of desired content elements into a web page template containing a hosting web server format, thus creating a new version of the recast web page;
  serving the new version of the recast web page to the client browser responsive to the second request; and
  caching the desired content elements from the more recent version of the original page at the hosting server.

5. The method as recited in claim 3 wherein the cached desired content elements are cached in the form of the recast page.

6. The method as recited in claim 1 further comprising the steps of:
  searching for a filter definition for web pages from the content provider server in a store of filter definitions; and
  responsive to identifying a filter definition for the content provider, using the identified filter definition to parse the original page.

7. The method as recited in claim 1, further comprising the steps of:
  searching for a filter definition for web pages from the content provider server in a store of filter definitions; and
  responsive to a failure to find a filter definition for the content provider, using a default filter to parse the original page.

8. The method as recited in claim 1, wherein at least some of the content in the recast page originates at a second content provider server and the method further comprises the steps of:
  responsive to a request from a client browser for a recast web page from a hosting web server, generating a request by the hosting web server for a second original web page from the second content provider web server;
  parsing the second original web page for a second set of desired content elements; and
  inserting the first and second set of desired content elements into a web page template containing a hosting web server format, thus creating the recast web page;
  wherein when presented by a client browser, both the first and second set of desired content elements look native to the hosting server.

9. The method as recited in claim 1, wherein the web page template contains navigational features for the hosting server.

10. The method as recited in claim 1, further comprising the step of processing the desired content elements to eliminate harmful code, prior to insertion in the web page template.

11. The method as recited in claim 1, further comprising the step of revising relative links in the original page to links appropriate to the recast web page.

12. The method as recited in claim 1, further comprising the steps of:
  responsive to a second request from a client browser for a second recast web page from a hosting web server, generating a request by the hosting web server for a second original web page from a second content provider web server;
  parsing the second original web page for a first set of desired content elements;
  inserting the first set of desired content elements into a web page template containing a hosting web server format, thus creating the second recast web page; and
  serving the second recast web page to the client browser;
  wherein the appearance of both the first and the second recast pages when presented by the client browser is as though all elements originated at the hosting web server.

13. The method as recited in claim 1, further comprising the steps of:
  determining client specific information about the client browser from which the request originated;
  selecting among a set of web page templates for the hosting server based on the client specific information, wherein each of the web page templates contains a different respective format; and
  using the selected web page template for creating the recast web page.

14. The method as recited in claim 13, wherein a plurality of web sites are serviced by the hosting web server and respective ones of the web page templates are used for each of the web sites.

15. A system for recasting web content on a hosting site, comprising:
  means for generating a request by the hosting web server for an original web page from a content provider web server;
  means for parsing the original web page for a first set of desired content elements;
  means for inserting the first set of desired content elements into a web page template containing a hosting web server format, thus creating a recast web page; and
  means for serving the recast web page to a client browser;
  wherein the appearance of the recast page when presented by the client browser is as though all elements originated at the hosting web server.

16. The system as recited in claim 15, wherein one of the desired content elements is an advertisement element from the content provider web server, and the system further comprises means for inserting a call back to the content provider web server for the advertising element.

17. The system as recited in claim 15 further comprising:
  a cache for caching the desired content from the original page at the hosting web server; and
  means for determining whether there is a more recent version of the original page at the content provider server;
  wherein the cached desired content is used if there is no more recent version of the original page to respond to the second request.

18. The system as recited in claim 17 further comprising:
  a store of URLs to content provider servers for cached content in the cache; and
  means for periodically polling the URLs to determine whether there is a more recent version of any of the cached content at any of the stored URLs.

19. The system as recited in claim 17 further comprising:
  means for parsing the most recent version of the original web page for the first set of desired content elements;
  means for inserting the first set of desired content elements into a web page template containing a hosting web server format, thus creating a new version of the recast web page; and
  means for serving the new version of the recast web page to the client browser responsive to the second request;

wherein the desired content elements from the more recent version of the original page are cached at the hosting server.

20. The system as recited in claim 15 further comprising:

a store of filter definitions;

means for searching for a filter definition for web pages from the content provider server in the store of filter definitions.

21. The system as recited in claim 20 wherein the store of filter definitions includes a default filter to be used when no filter definition exists for the content provider server.

22. The system as recited in claim 15, wherein at least some of the content in the recast page originates at a second content provider server and when the recast page is presented by a client browser, both the first and second set of desired content elements look native to the hosting server.

23. The system as recited in claim 15, wherein the web page template contains navigational features for the hosting server.

24. The system as recited in claim 15, further comprising means for processing the desired content elements to eliminate harmful code, prior to insertion in the web page template.

25. The system as recited in claim 15, further comprising means for revising relative links in the original page to links appropriate to the recast web page.

26. The system as recited in claim 15, further comprising:

means for determining client specific information about the client browser from which the request originated; and means for selecting among a set of web page templates for the hosting server based on the client specific information, wherein each of the web page templates contains a different respective format;

wherein the selected web page template is used for creating the recast web page.

27. The system as recited in claim 26, wherein a plurality of web sites are serviced by the hosting web server and respective ones of the web page templates are used for each of the web sites.

28. A computer program product for recasting web content on a hosting site, comprising:

means for generating a request by the hosting web server for an original web page from a content provider web server;

means for parsing the original web page for a first set of desired content elements;

means for inserting the first set of desired content elements into a web page template containing a hosting web server format, thus creating a recast web page; and means for serving the recast web page to a client browser;

wherein the appearance of the recast page when presented by the client browser is as though all elements originated at the hosting web server.

29. The product as recited in claim 28, wherein one of the desired content elements is an advertisement element from the content provider web server, and the system further comprises means for inserting a call back to the content provider web server for the advertising element.

30. The product as recited in claim 28 further comprising:

means for caching the desired content from the original page at the hosting web server; and means for determining whether there is a more recent version of the original page at the content provider server;

wherein the cached desired content is used if there is no more recent version of the original page to respond to the second request.

31. The product as recited in claim 28 further comprising:

a store of URLs to content provider servers for cached content in the cache; and means for periodically polling the URLs to determine whether there is a more recent version of any of the cached content at any of the stored URLs.

32. The product as recited in claim 28 further comprising:

means for storing a set of filter definitions; and means for searching for a filter definition for web pages from the content provider server in the set of filter definitions.

33. The product as recited in claim 28, wherein the web page template contains navigational features for the hosting server.

34. The product as recited in claim 28, further comprising means for processing the desired content elements to eliminate harmful code, prior to insertion in the web page template.

35. The product as recited in claim 28, further comprising means for revising relative links in the original page to links appropriate to the recast web page.

36. The product as recited in claim 28, further comprising:

means for determining client specific information about the client browser from which the request originated; and means for selecting among a set of web page templates for the hosting server based on the client specific information, wherein each of the web page templates contains a different respective format;

wherein the selected web page template is used for creating the recast web page.

37. The product as recited in claim 36, further comprising means for servicing a plurality of web sites by the hosting web server and respective ones of the web page templates are used for each of the web sites.

* * * * *